US012560693B2

(12) United States Patent
Ota et al.

(10) Patent No.: US 12,560,693 B2
(45) Date of Patent: Feb. 24, 2026

(54) WIRELESS SYSTEM

(71) Applicant: PANASONIC INTELLECTUAL PROPERTY MANAGEMENT CO., LTD., Osaka (JP)

(72) Inventors: Shinya Ota, Kanagawa (JP); Shigetomo Tamoi, Kanagawa (JP); Genki Saito, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 274 days.

(21) Appl. No.: 18/397,855

(22) Filed: Dec. 27, 2023

(65) Prior Publication Data

US 2024/0125909 A1 Apr. 18, 2024

Related U.S. Application Data

(63) Continuation of application No. PCT/JP2022/001148, filed on Jan. 14, 2022.

(30) Foreign Application Priority Data

Jun. 30, 2021 (JP) ................................. 2021-108963

(51) Int. Cl.
*G01S 11/06* (2006.01)
*H01Q 9/16* (2006.01)
*H01Q 21/24* (2006.01)

(52) U.S. Cl.
CPC ................ *G01S 11/06* (2013.01); *H01Q 9/16* (2013.01); *H01Q 21/24* (2013.01)

(58) Field of Classification Search
CPC ........ G01S 5/0252; G01S 11/02; G01S 11/06; G01S 13/06; G01S 13/46; H01Q 1/241;
(Continued)

(56) References Cited

U.S. PATENT DOCUMENTS 7,768,392 B1 * 8/2010 Brand .................... G01D 21/00
340/539.13
7,805,169 B2 * 9/2010 Hicks, III ........... H04M 1/6083
455/575.9
(Continued)

FOREIGN PATENT DOCUMENTS

JP 2001357485 A 12/2001
JP 2003066139 A 3/2003
(Continued)

OTHER PUBLICATIONS

International Search Report, mailed Feb. 22, 2022, for PCT Patent Application No. 1 PCT/JP2022/001148. (6 pages) (with English translation).

*Primary Examiner* — Peter M Bythrow
(74) *Attorney, Agent, or Firm* — Seed Intellectual Property Law Group LLP

(57) ABSTRACT

A wireless system capable of accurately and inexpensively measuring a distance between a vehicle and a mobile terminal is provided. When a first sum of a first received signal strength indication and a second received signal strength indication is larger than a second sum of a third received signal strength indication and a fourth received signal strength indication, a distance between the vehicle and the mobile terminal is obtained from a phase difference between a first radio wave and a second radio wave. When the first sum of the first received signal strength indication and the second received signal strength indication is smaller than the second sum of the third received signal strength indication and the fourth received signal strength indication, the distance between the vehicle and the mobile terminal is obtained from a phase difference between a third radio wave and a fourth radio wave.

20 Claims, 10 Drawing Sheets

(58) Field of Classification Search
CPC ...... H01Q 1/3233; H01Q 21/24; H01Q 21/28;
H01Q 9/16
See application file for complete search history.

(56) References Cited

U.S. PATENT DOCUMENTS

| | | | | |
|---|---|---|---|---|
| 8,001,055 | B2 * | 8/2011 | Weiss | G06Q 20/40145 |
| | | | | 382/187 |
| 9,203,944 | B2 * | 12/2015 | Morrissey | H04W 88/06 |
| 9,349,282 | B2 * | 5/2016 | Luna | H04R 29/001 |
| 9,754,482 | B2 * | 9/2017 | Machida | G08C 17/02 |
| 9,967,717 | B2 * | 5/2018 | Buttolo | H04W 68/005 |
| 10,046,637 | B2 * | 8/2018 | Buttolo | B60K 35/10 |
| 10,082,877 | B2 * | 9/2018 | Tokish | B60W 40/10 |
| 10,205,218 | B2 * | 2/2019 | Charvat | G01S 5/0284 |
| 10,328,898 | B2 * | 6/2019 | Golsch | B60R 25/20 |
| 10,328,899 | B2 * | 6/2019 | Golsch | B60R 25/24 |
| 10,328,900 | B1 * | 6/2019 | Yakovenko | B60R 25/24 |
| 10,471,931 | B2 * | 11/2019 | Naitou | G07C 9/00309 |
| 10,559,149 | B1 * | 2/2020 | Kuechler | G07C 9/00309 |
| 10,827,305 | B2 * | 11/2020 | Odejerte, Jr. | G01S 13/878 |
| 11,223,136 | B2 * | 1/2022 | Ahmed | G01S 3/46 |
| 11,630,194 | B2 * | 4/2023 | Osai | G08C 17/02 |
| | | | | 701/2 |
| 11,740,342 | B2 * | 8/2023 | Eber | G01S 5/0205 |
| | | | | 342/458 |
| 12,187,300 | B2 * | 1/2025 | Oh | B60W 10/20 |
| 12,397,748 | B2 * | 8/2025 | Bourassi | B60R 25/245 |
| 2002/0068543 | A1 * | 6/2002 | Shah | H04W 84/042 |
| | | | | 455/433 |
| 2015/0045090 | A1 * | 2/2015 | Morrissey | H04M 1/6075 |
| | | | | 455/552.1 |
| 2015/0148990 | A1 * | 5/2015 | Patel | F02N 11/0807 |
| | | | | 701/2 |
| 2018/0267154 | A1 | 9/2018 | Ootaka et al. | |
| 2020/0106158 | A1 | 4/2020 | Gomez Angulo et al. | |
| 2021/0181322 | A1 | 6/2021 | Ootaka et al. | |

FOREIGN PATENT DOCUMENTS

| | | |
|---|---|---|
| JP | 2012078370 A | 4/2012 |
| JP | 2014178120 A | 9/2014 |
| JP | 2018087789 A | 6/2018 |
| JP | 2018155724 A | 10/2018 |
| JP | 2020058020 A | 4/2020 |
| KR | 20030018912 A | 3/2003 |

* cited by examiner (CONT.)

(FIG. 7 CONTINUED)
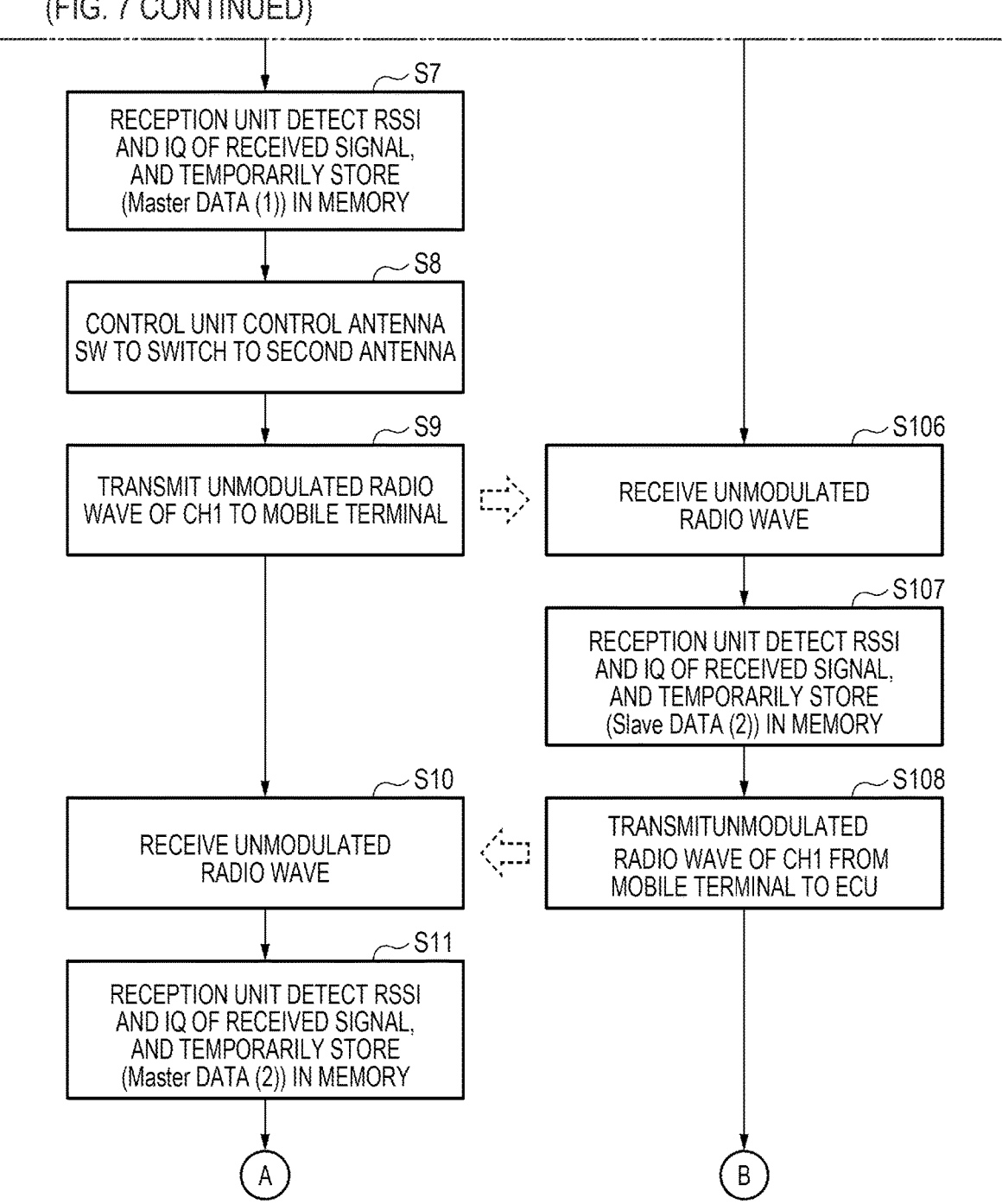

(FIG. 9 CONTINUED)
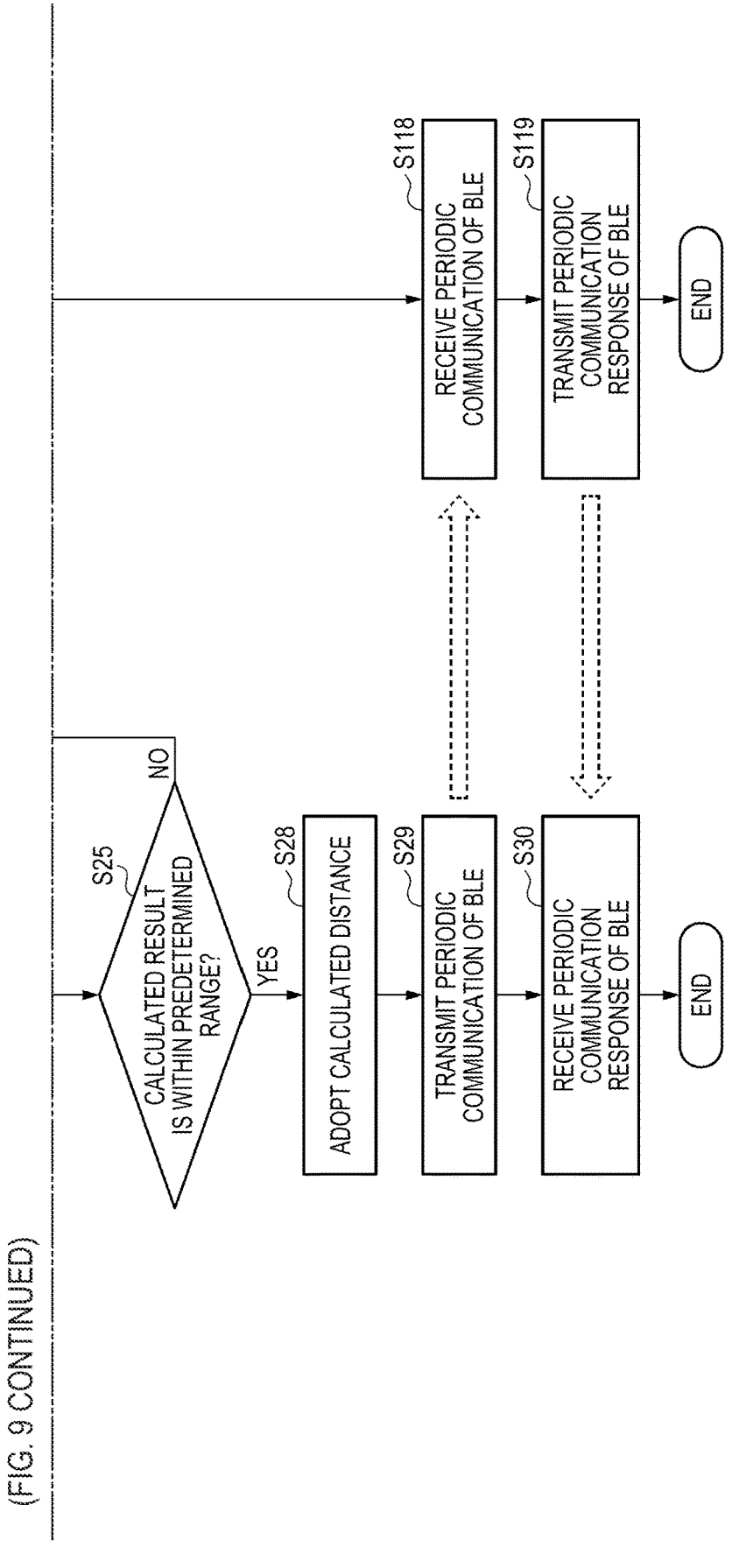

FIG. 10

DETAIL OF DISTANCE MEASUREMENT
START REQUEST PACKET

| Preamble | DEVICE ID | COMMAND (DISTANCE MEASUREMENT START INSTRUCTION) | CRC |
|---|---|---|---|

FIG. 11

DETAIL OF Slave DATA TRANSMISSION PACKET

| Preamble | DEVICE ID | COMMAND (Slave DATA) | Slave RSSI | Slave IQ DATA | CRC |
|---|---|---|---|---|---|

FIG. 12

DETAIL OF RETRY REQUEST PACKET

| Preamble | DEVICE ID | COMMAND (RETRY REQUEST) | CRC |
|---|---|---|---|

WIRELESS SYSTEM

CROSS-REFERENCE TO RELATED APPLICATIONS

This is a continuation of International Application No. PCT/JP2022/001148 filed on Jan. 14, 2022, and claims priority from Japanese Patent Application No. 2021-108963 filed on Jun. 30, 2021, the entire content of which is incorporated herein by reference.

TECHNICAL FIELD

The present disclosure relates to a wireless system including a vehicle and a mobile terminal capable of performing wireless communication with the vehicle.

BACKGROUND ART

In recent years, in an in-vehicle field, in order to use a smartphone as a key of a vehicle, a distance measurement system is developed which estimates a position of the smartphone by using Bluetooth (registered trademark) communication, and controls locking of the vehicle and starting of an engine according to the estimated position.

In Bluetooth communication using a high-frequency band, accurate distance estimation cannot be performed with a received signal strength indication (RSSI). Therefore, a distance measurement technique using phase difference information between a plurality of channels is proposed (Patent Literature 1).

CITATION LIST

Patent Literature

Patent Literature 1: JP2018-155724A
Patent Literature 2: JP2020-058020A

SUMMARY OF INVENTION

However, a phase difference between channels tends to vary when the RSSI is extremely low, and there are a plurality of points where the RSSI decreases (that is, "null") due to propagation characteristics of Bluetooth radio waves, and thus if communication is performed by using only one antenna as in a related electronic control unit (ECU), an accurate distance may not be measured. The RSSI decreases when a radio wave from the smartphone is blocked by a human body, and thus also in this case, if communication is performed with only one antenna, an accurate distance may not be measured. As a solution to these problems, there is proposed a proposal (Patent Literature 2) of performing distance measurement by using four antennas, but when four antennas are used, cost increases, and power consumption required for antenna switching increases.

An object of the present disclosure is to provide a wireless system capable of accurately and inexpensively measuring a distance between a vehicle and a mobile terminal.

A wireless system according to the present disclosure includes a vehicle and a mobile terminal. The vehicle includes a vehicle body, a first wheel and a second wheel coupled to the vehicle body, a substrate disposed inside the vehicle body and having a predetermined insulating property, a first antenna of which at least a part is formed of a first conductive member having a predetermined conductivity on the substrate, and a second antenna of which at least a part is formed of a second conductive member having a predetermined conductivity on the substrate. The vehicle is configured to move with the first wheel and the second wheel. The mobile terminal includes a third antenna, on the substrate, a first polarization direction of the first antenna is different from a second polarization direction of the second antenna, the third antenna of the mobile terminal is configured to transmit at least a first radio wave having a first wavelength and a second radio wave having a second wavelength different from the first wavelength. The first antenna of the vehicle is configured to receive the first radio wave and the second radio wave, and detect a first received signal strength indication of the first radio wave and a second received signal strength indication of the second radio wave. The third antenna of the mobile terminal is configured to transmit at least a third radio wave having a third wavelength and a fourth radio wave having a fourth wavelength different from the third wavelength. The second antenna of the vehicle is configured to receive the third radio wave and the fourth radio wave, and detect a third received signal strength indication of the third radio wave and a fourth received signal strength indication of the fourth radio wave. When a first sum of the first received signal strength indication and the second received signal strength indication is larger than a second sum of the third received signal strength indication and the fourth received signal strength indication, a distance between the vehicle and the mobile terminal is obtained from a phase difference between the first radio wave and the second radio wave. When the first sum of the first received signal strength indication and the second received signal strength indication is smaller than the second sum of the third received signal strength indication and the fourth received signal strength indication, the distance between the vehicle and the mobile terminal is obtained from a phase difference between the third radio wave and the fourth radio wave.

According to the present disclosure, the mobile terminal includes the third antenna, the third antenna transmits the first radio wave having the first wavelength and the second radio wave having the second wavelength, the third antenna transmits the third radio wave having the third wavelength and the fourth radio wave having the fourth wavelength, the vehicle includes the first antenna and the second antenna having different polarization directions, the first antenna receives the first radio wave and the second radio wave transmitted from the mobile terminal and detects the received signal strength indication of each of the received first radio wave and second radio wave, the second antenna receives the third radio wave and the fourth radio wave transmitted from the mobile terminal and detects the received signal strength indication of each of the received third radio wave and fourth radio wave, in response to the sum of the received signal strength indications of the first radio wave and the second radio wave received by the first antenna being larger than the sum of the received signal strength indications of the third radio wave and the fourth radio wave received by the second antenna, the distance between the vehicle and the mobile terminal is obtained from the phase difference between the first radio wave and the second radio wave received by the first antenna, and in response to the sum of the received signal strength indications of the first radio wave and the second radio wave received by the first antenna being smaller than the sum of the received signal strength indications of the third radio wave and the fourth radio wave received by the second antenna, the distance between the vehicle and the mobile terminal is obtained from the phase difference between the third radio wave and the fourth radio wave received by the second antenna, and thus the distance between the vehicle and the mobile terminal can be always obtained with high accuracy. The number of antennas used in the vehicle is two, and thus it is possible to achieve a lower price and reduce power consumption accompanying antenna switching as compared with the related art using four antennas.

In the wireless system according to present disclosure having the above configuration, the first antenna of the vehicle is configured to transmit at least a fifth radio wave having the first wavelength and a sixth radio wave having the second wavelength, the third antenna of the mobile terminal is configured to receive the fifth radio wave and the sixth radio wave, and detect a fifth received signal strength indication of the fifth radio wave and a sixth received signal strength indication of the sixth radio wave, the second antenna of the vehicle is configured to transmit at least a seventh radio wave having the third wavelength and an eighth radio wave having the fourth wavelength, the third antenna of the mobile terminal is configured to receive the seventh radio wave and the eighth radio wave, and detect a seventh received signal strength indication of the seventh radio wave and an eighth received signal strength indication of the eighth radio wave. When a third sum of the first received signal strength indication, the second received signal strength indication, the fifth received signal strength indication, and the sixth received signal strength indication is larger than a fourth sum of the third received signal strength indication, the fourth received signal strength indication, the seventh received signal strength indication, and the eighth received signal strength indication, the distance between the vehicle and the mobile terminal is obtained from a first phase difference between the first radio wave and the second radio wave and a second phase difference between the fifth radio wave and the sixth radio wave. Further, when the third sum of the first received signal strength indication, the second received signal strength indication, the fifth received signal strength indication, and the sixth received signal strength indication is smaller than the fourth sum of the third received signal strength indication, the fourth received signal strength indication, the seventh received signal strength indication, and the eighth received signal strength indication, the distance between the vehicle and the mobile terminal is obtained from a third phase difference between the third radio wave and the fourth radio wave and a fourth phase difference between the seventh radio wave and the eighth radio wave.

According to the present disclosure, the first antenna of the vehicle transmits the fifth radio wave having the first wavelength and the sixth radio wave having the second wavelength, the second antenna of the vehicle transmits the seventh radio wave having the third wavelength and the eighth radio wave having the fourth wavelength, the third antenna of the mobile terminal receives the fifth radio wave and the sixth radio wave, detects the fifth received signal strength indication of the fifth radio wave and the sixth received signal strength indication of the sixth radio wave, the third antenna of the mobile terminal receives the seventh radio wave and the eighth radio wave, and detects the seventh received signal strength indication of the seventh radio wave and the eighth received signal strength indication of the eighth radio wave, in response to the third sum of the first received signal strength indication and the second received signal strength indication detected by the first antenna and the fifth received signal strength indication and the sixth received signal strength indication detected by the third antenna being larger than the fourth sum of the third received signal strength indication and the fourth received signal strength indication detected by the second antenna and the seventh received signal strength indication and the eighth received signal strength indication detected by the third antenna, the distance between the vehicle and the mobile terminal is obtained from the first phase difference between the first radio wave and the second radio wave and the second phase difference between the fifth radio wave and the sixth radio wave, and in response to the third sum of the first received signal strength indication, the second received signal strength indication, the fifth received signal strength indication, and the sixth received signal strength indication being smaller than the fourth sum of the third received signal strength indication, the fourth received signal strength indication, the seventh received signal strength indication, and the eighth received signal strength indication, the distance between the vehicle and the mobile terminal is obtained from the third phase difference between the third radio wave and the fourth radio wave and the fourth phase difference between the seventh radio wave and the eighth radio wave, and thus the distance between the vehicle and the mobile terminal can be obtained with higher accuracy. The number of antennas used in the vehicle is two, and thus it is possible to achieve a lower price and reduce power consumption accompanying antenna switching as compared with the related art using four antennas.

In the wireless system according to the present disclosure having the above configuration, the mobile terminal is configured to notify the vehicle of the fifth received signal strength indication, the sixth received signal strength indication, the seventh received signal strength indication, and the eighth received signal strength indication, and the vehicle is configured to obtain the distance between the vehicle and the mobile terminal.

According to the present disclosure, the vehicle can obtain the distance between the vehicle and the mobile terminal based on the fifth received signal strength indication, the sixth received signal strength indication, the seventh received signal strength indication, and the eighth received signal strength indication notified from the mobile terminal.

In the wireless system according to the present disclosure having the above configuration, the mobile terminal includes a first storage unit configured to hold at least the fifth received signal strength indication, the sixth received signal strength indication, the seventh received signal strength indication, and the eighth received signal strength indication.

According to the present disclosure, the mobile terminal can store the detected fifth received signal strength indication, sixth received signal strength indication, seventh received signal strength indication, and eighth received signal strength indication.

In the wireless system according to the present disclosure having the above configuration, the vehicle includes a second storage unit configured to hold at least the first received signal strength indication, the second received signal strength indication, the third received signal strength indication, and the fourth received signal strength indication.

According to the present disclosure, the vehicle can store the detected first received signal strength indication, second received signal strength indication, third received signal strength indication, and fourth received signal strength indication.

In the wireless system according to the present disclosure having the above configuration, the mobile terminal includes a first control circuit, and the vehicle includes a second control circuit.

According to the present disclosure, control for obtaining the distance between the vehicle and the mobile terminal and control after the distance is obtained can be performed in each of the mobile terminal and the vehicle.

In the wireless system according to the present disclosure having the above configuration, a setting of the vehicle is configured to change according to the distance between the vehicle and the mobile terminal.

According to the present disclosure, for example, in response to the distance between the vehicle and the mobile terminal being a predetermined value or more, the operation is not accepted, and in response to the distance being the predetermined value or less, the operation is accepted. In response to the distance between the vehicle and the mobile terminal being the predetermined value, the operation may be accepted or may not be accepted.

In the wireless system according to the present disclosure having the above configuration, the first wavelength is the same as the third wavelength, and the second wavelength is the same as the fourth wavelength.

According to the present disclosure, it is unnecessary to control to change the wavelength as compared with a case in which the first wavelength and the third wavelength are set to different wavelengths and the second wavelength and the fourth wavelength are set to different wavelengths, which contributes to reduction in cost.

In the wireless system according to the present disclosure having the above configuration, the first antenna is a first dipole antenna, the first dipole antenna includes at least a first hot element and a first ground element, an effective length of the first hot element is ¼ of a wavelength of a used frequency, and an effective length of the first ground element is ¼ of the wavelength of the used frequency.

According to the present disclosure, a maximum gain as a dipole antenna is obtained, and directivity can be substantially equalized at an angle of 360 degrees, and thus the distance between the vehicle and the mobile terminal can be measured with substantially the same accuracy when the mobile terminal is positioned at any position with respect to the vehicle.

In the wireless system according to the present disclosure having the above configuration, the second antenna is a second dipole antenna, the second dipole antenna includes at least a second hot element and a second ground element, an effective length of the second hot element is ¼ of a wavelength of a used frequency, the second ground element includes a loop shaped portion, and an effective length of the loop shaped portion is ¼ of the wavelength of the used frequency.

According to the present disclosure, a maximum gain as a dipole antenna is obtained, and directivity can be substantially equalized at an angle of 360 degrees, and thus the distance between the vehicle and the mobile terminal can be measured with substantially the same accuracy when the mobile terminal is positioned at any position with respect to the vehicle.

A wireless system according to the present disclosure includes a mobile terminal and a wireless communication device configured to be mounted on a vehicle. The wireless communication device includes a substrate disposed inside a vehicle body of the vehicle and having a predetermined insulating property, a first antenna of which at least a part is formed of a first conductive member having a predetermined conductivity on the substrate, and a second antenna of which at least a part is formed of a second conductive member having a predetermined conductivity on the substrate. The mobile terminal includes a third antenna. On the substrate, a first polarization direction of the first antenna is different from a second polarization direction of the second antenna, the third antenna of the mobile terminal is configured to transmit at least a first radio wave having a first wavelength and a second radio wave having a second wavelength different from the first wavelength, the first antenna of the wireless communication device is configured to receive the first radio wave and the second radio wave, and detect a first received signal strength indication of the first radio wave and a second received signal strength indication of the second radio wave. The third antenna of the mobile terminal is configured to transmit at least a third radio wave having a third wavelength and a fourth radio wave having a fourth wavelength different from the third wavelength, the second antenna of the wireless communication device is configured to receive the third radio wave and the fourth radio wave, and detect a third received signal strength indication of the third radio wave and a fourth received signal strength indication of the fourth radio wave. when a first sum of the first received signal strength indication and the second received signal strength indication is larger than a second sum of the third received signal strength indication and the fourth received signal strength indication, a distance between the wireless communication device and the mobile terminal is obtained from a phase difference between the first radio wave and the second radio wave. Further, when the first sum of the first received signal strength indication and the second received signal strength indication is smaller than the second sum of the third received signal strength indication and the fourth received signal strength indication, the distance between the wireless communication device and the mobile terminal is obtained from a phase difference between the third radio wave and the fourth radio wave.

According to the present disclosure, the mobile terminal transmits four radio waves having different wavelengths from the third antenna, the wireless communication device receives the radio waves transmitted from the mobile terminal by the first antenna and the second antenna having different polarization directions, detects the received signal strength indication of each of the two radio waves received by the first antenna, and detects the received signal strength indication of each of the two radio waves received by the second antenna, in response to the sum of the received signal strength indications of the two radio waves received by the first antenna being larger than the sum of the received signal strength indications of the two radio waves received by the second antenna, the distance between the wireless communication device and the mobile terminal is obtained from the phase difference between the two radio waves received by the first antenna, and in response to the sum of the received signal strength indications of the two radio waves received by the first antenna being smaller than the sum of the received signal strength indications of the two radio waves received by the second antenna, the distance between the wireless communication device and the mobile terminal is obtained from the phase difference between the two radio waves received by the second antenna, and thus the distance between the wireless communication device and the mobile terminal can be always obtained with high accuracy. The number of antennas used in the wireless communication device is two, and thus it is possible to achieve a lower price and reduce power consumption accompanying antenna switching as compared with the related art using four antennas.

In the wireless system according to the present disclosure having the above configuration, the first antenna of the wireless communication device is configured to transmit at least a fifth radio wave having the first wavelength and a sixth radio wave having the second wavelength, the third antenna of the mobile terminal is configured to receive the fifth radio wave and the sixth radio wave, and detect a fifth received signal strength indication of the fifth radio wave and a sixth received signal strength indication of the sixth radio wave, the second antenna of the wireless communication device is configured to transmit at least a seventh radio wave having the third wavelength and an eighth radio wave having the fourth wavelength, the third antenna of the mobile terminal is configured to receive the seventh radio wave and the eighth radio wave, and detect a seventh received signal strength indication of the seventh radio wave and an eighth received signal strength indication of the eighth radio wave, in response to a third sum of the first received signal strength indication, the second received signal strength indication, the fifth received signal strength indication, and the sixth received signal strength indication being larger than a fourth sum of the third received signal strength indication, the fourth received signal strength indication, the seventh received signal strength indication, and the eighth received signal strength indication, the distance between the wireless communication device and the mobile terminal is obtained from a first phase difference between the first radio wave and the second radio wave and a second phase difference between the fifth radio wave and the sixth radio wave, and in response to the third sum of the first received signal strength indication, the second received signal strength indication, the fifth received signal strength indication, and the sixth received signal strength indication being smaller than the fourth sum of the third received signal strength indication, the fourth received signal strength indication, the seventh received signal strength indication, and the eighth received signal strength indication, the distance between the wireless communication device and the mobile terminal is obtained from a third phase difference between the third radio wave and the fourth radio wave and a fourth phase difference between the seventh radio wave and the eighth radio wave.

According to the present disclosure, the first antenna of the wireless communication device transmits the fifth radio wave having the first wavelength and the sixth radio wave having the second wavelength, the second antenna of the wireless communication device transmits the seventh radio wave having the third wavelength and the eighth radio wave having the fourth wavelength, the third antenna of the mobile terminal receives the fifth radio wave and the sixth radio wave, detects the fifth received signal strength indication of the fifth radio wave and the sixth received signal strength indication of the sixth radio wave, the third antenna of the mobile terminal receives the seventh radio wave and the eighth radio wave, and detects the seventh received signal strength indication of the seventh radio wave and the eighth received signal strength indication of the eighth radio wave. In response to the third sum of the first received signal strength indication and the second received signal strength indication detected by the first antenna and the fifth received signal strength indication and the sixth received signal strength indication detected by the third antenna being larger than the fourth sum of the third received signal strength indication and the fourth received signal strength indication detected by the second antenna and the seventh received signal strength indication and the eighth received signal strength indication detected by the third antenna, the distance between the wireless communication device and the mobile terminal is obtained from the first phase difference between the first radio wave and the second radio wave and the second phase difference between the fifth radio wave and the sixth radio wave, and in response to the third sum of the first received signal strength indication, the second received signal strength indication, the fifth received signal strength indication, and the sixth received signal strength indication being smaller than the fourth sum of the third received signal strength indication, the fourth received signal strength indication, the seventh received signal strength indication, and the eighth received signal strength indication, the distance between the wireless communication device and the mobile terminal is obtained from the third phase difference between the third radio wave and the fourth radio wave and the fourth phase difference between the seventh radio wave and the eighth radio wave, and thus the distance between the wireless communication device and the mobile terminal can be obtained with higher accuracy. The number of antennas used in the wireless communication device is two, and thus it is possible to achieve a lower price and reduce power consumption accompanying antenna switching as compared with the related art using four antennas.

In the wireless system according to the present disclosure having the above configuration, the mobile terminal is configured to notify the wireless communication device of the fifth received signal strength indication, the sixth received signal strength indication, the seventh received signal strength indication, and the eighth received signal strength indication, and the wireless communication device is configured to obtain the distance between the wireless communication device and the mobile terminal.

According to the present disclosure, the wireless communication device can obtain the distance between the wireless communication device and the mobile terminal based on the fifth received signal strength indication, the sixth received signal strength indication, the seventh received signal strength indication, and the eighth received signal strength indication notified from the mobile terminal.

In the wireless system according to the present disclosure having the above configuration, the mobile terminal includes a first storage unit configured to hold at least the fifth received signal strength indication, the sixth received signal strength indication, the seventh received signal strength indication, and the eighth received signal strength indication.

According to the present disclosure, the mobile terminal can store the detected fifth received signal strength indication, sixth received signal strength indication, seventh received signal strength indication, and eighth received signal strength indication.

In the wireless system according to the present disclosure having the above configuration, the wireless communication device includes a second storage unit configured to hold at least the first received signal strength indication, the second received signal strength indication, the third received signal strength indication, and the fourth received signal strength indication.

According to the present disclosure, the wireless communication device can store the detected first received signal strength indication, second received signal strength indication, third received signal strength indication, and fourth received signal strength indication.

In the wireless system according to the present disclosure having the above configuration, the mobile terminal includes a first control circuit, and the wireless communication device includes a second control circuit.

According to the present disclosure, control for obtaining the distance between the wireless communication device and the mobile terminal and control after the distance is obtained can be performed in each of the mobile terminal and the wireless communication device.

In the wireless system according to the present disclosure having the above configuration, a setting of the vehicle is configured to change according to the distance between the wireless communication device and the mobile terminal.

According to the present disclosure, for example, in response to the distance between the wireless communication device and the mobile terminal being a predetermined value or more, the operation is not accepted, and in response to the distance being the predetermined value or less, the operation is accepted. In response to the distance between the wireless communication device and the mobile terminal being the predetermined value, the operation may be accepted or may not be accepted.

In the wireless system according to the present disclosure having the above configuration, the first wavelength is the same as the third wavelength, and the second wavelength is the same as the fourth wavelength.

According to the present disclosure, it is unnecessary to control to change the wavelength as compared with a case in which the first wavelength and the third wavelength are set to different wavelengths and the second wavelength and the fourth wavelength are set to different wavelengths, which contributes to reduction in cost.

In the wireless system according to the present disclosure having the above configuration, the first antenna is a first dipole antenna, the first dipole antenna includes at least a first hot element and a first ground element, an effective length of the first hot element is $1/4$ of a wavelength of a used frequency, and an effective length of the first ground element is $1/4$ of the wavelength of the used frequency.

According to the present disclosure, a maximum gain as a dipole antenna is obtained, and directivity can be substantially equalized at an angle of 360 degrees, and thus the distance between the wireless communication device and the mobile terminal can be measured with substantially the same accuracy when the mobile terminal is positioned at any position with respect to the wireless communication device.

In the wireless system according to the present disclosure having the above configuration, the second antenna is a second dipole antenna, the second dipole antenna includes at least a second hot element and a second ground element, an effective length of the second hot element is $1/4$ of a wavelength of a used frequency, the second ground element includes a loop shaped portion, and an effective length of the loop shaped portion is $1/4$ of the wavelength of the used frequency.

According to the present disclosure, a maximum gain as a dipole antenna is obtained, and directivity can be substantially equalized at an angle of 360 degrees, and thus the distance between the wireless communication device and the mobile terminal can be measured with substantially the same accuracy when the mobile terminal is positioned at any position with respect to the wireless communication device.

According to the present disclosure, it is possible to accurately and inexpensively measure the distance between the vehicle (or the wireless communication device) and the mobile terminal.

BRIEF DESCRIPTION OF DRAWINGS

FIG. 10 is a diagram illustrating a distance measurement start request packet transmitted from the ECU constituting the wireless system according to the embodiment;

FIG. 11 is a diagram illustrating a Slave data transmission packet transmitted from the mobile terminal constituting the wireless system according to the embodiment; and FIG. 12 is a diagram illustrating a retry request packet transmitted from the ECU constituting the wireless system according to the embodiment.

DESCRIPTION OF EMBODIMENTS

Hereinafter, an embodiment (hereinafter, referred to as "a present embodiment") in which a wireless system according to the present disclosure is specifically disclosed will be described in detail with reference to the drawings as appropriate. However, unnecessarily detailed descriptions may be omitted. For example, detailed description of well-known matters and redundant description of substantially the same configuration may be omitted. This is to avoid the following description from being unnecessarily redundant and facilitate understanding of those skilled in the art. The accompanying drawings and the following description are provided for those skilled in the art to fully understand the present disclosure, and are not intended to limit the subject matters described in the claims.

Hereinafter, a preferred present embodiment for carrying out the present disclosure will be described in detail with reference to the drawings.

Figure 1:
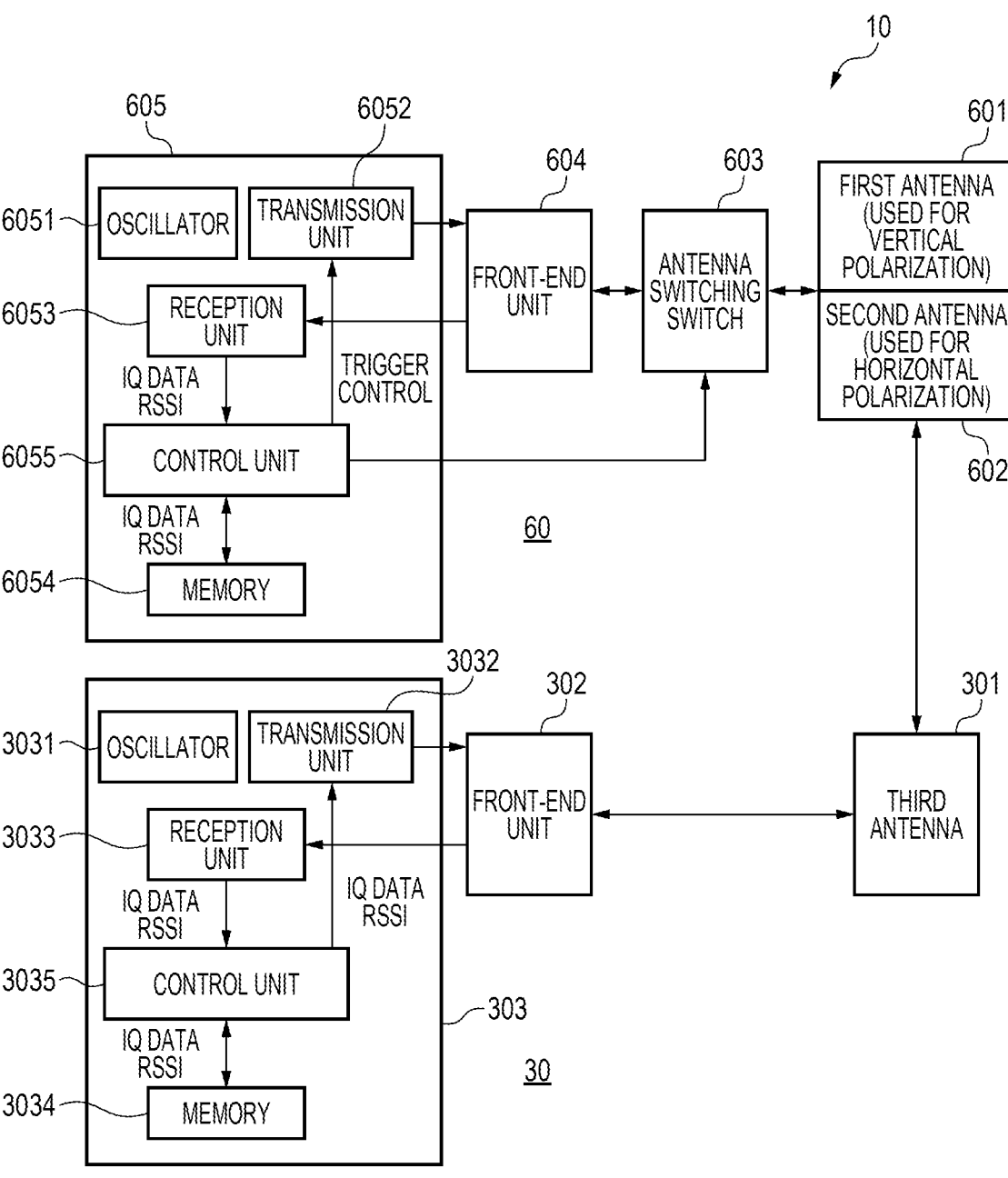
FIG. 1 is a block diagram illustrating a schematic configuration of a wireless system according to an embodiment.
Figure 2:
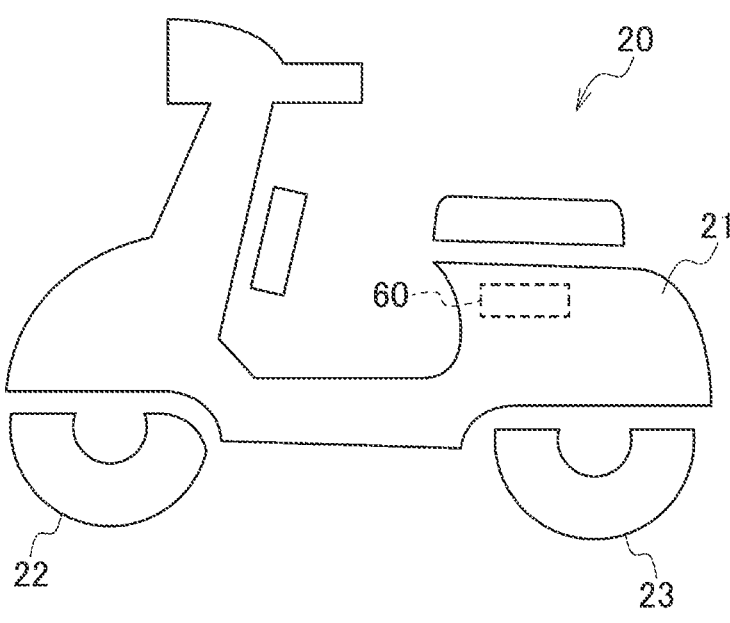
FIG. 2 is a side view illustrating an appearance of a vehicle constituting the wireless system according to the embodiment.

Hereinafter, the wireless system according to the present embodiment will be described with reference to the drawings. FIG. 1 is a block diagram illustrating a schematic configuration of a wireless system 10 according to the present embodiment. FIG. 2 is a side view illustrating an appearance of a vehicle 20 constituting the wireless system 10 according to the present embodiment. In FIGS. 1 and 2, the wireless system 10 according to the present embodiment includes the vehicle 20 which is a motorcycle, a mobile terminal 30 carried by a user of the vehicle 20, and an ECU 60 which is a wireless communication device disposed inside the vehicle 20. The vehicle 20 includes a vehicle body 21, and a front wheel (a first wheel) 22 and a rear wheel (a second wheel) 23 coupled to the vehicle body 21. The vehicle 20 is not limited to a two-wheeled vehicle, and may be a monocycle or a vehicle including three or more wheels.

The mobile terminal 30 includes a box enclosure having a shape and size suitable for carrying. The mobile terminal 30 is registered in the ECU 60 in advance so as to be paired with the ECU 60. Bluetooth (registered trademark) low energy (LE) is used for communication between the ECU 60 and the mobile terminal 30. A frequency used in Bluetooth LE (hereinafter, referred to as "BLE") is about 2.4 GHz band, and a communication distance is about 100 m. The mobile terminal 30 is also called an electronic key or a FOB key, and may be a smartphone.

In FIG. 1, the mobile terminal 30 includes a third antenna 301, a front-end unit 302, and a control circuit (a first control circuit) 303. The third antenna 301 is, for example, a dipole antenna, and includes a hot element and a ground element. An effective length of the hot element is ¼ of a wavelength of a used frequency, and an effective length of the ground element is ¼ of the wavelength of the used frequency. The third antenna 301 is not limited to the dipole antenna, and may be implemented by a plurality of antenna elements.

The front-end unit 302 performs amplification of a weak signal, conversion from a high frequency to a low frequency, prevention of wraparound of a transmission signal to a reception unit side, and the like. The control circuit 303 includes an oscillator 3031, a transmission unit 3032, a reception unit 3033, a memory (a first storage unit) 3034, and a control unit (a first control circuit) 3035. The oscillator 3031 is a local oscillator that generates a carrier wave signal. The transmission unit 3032 generates a radio wave from IQ data (a baseband signal) to be transmitted, and transmits the radio wave from the third antenna 301 via the front-end unit 302. The reception unit 3033 extracts IQ data from a radio wave received by the third antenna 301 and detects a received signal strength indication (RSSI).

The control unit 3035 performs control to transmit a plurality of radio waves having different wavelengths. Specifically, the control is performed to transmit a first radio wave having a first wavelength, a second radio wave having a second wavelength different from the first wavelength, a third radio wave having a third wavelength, and a fourth radio wave having a fourth wavelength different from the third wavelength.

In addition to the transmission control, the control unit 3035 also performs control to receive a plurality of radio waves having different wavelengths. Specifically, the control is performed to receive a fifth radio wave having the first wavelength, a sixth radio wave having the second wavelength, a seventh radio wave having the third wavelength, and an eighth radio wave having the fourth wavelength.

The first wavelength and the third wavelength may be the same wavelength. The second wavelength and the fourth wavelength may be the same wavelength.

The control unit 3035 also performs control to detect a received signal strength indication of the received radio wave. The control unit 3035 detects a fifth received signal strength indication of the fifth radio wave, a sixth received signal strength indication of the sixth radio wave, a seventh received signal strength indication of the seventh radio wave, and an eighth received signal strength indication of the eighth radio wave. The control unit 3035 stores the detected received signal strength indications (the fifth received signal strength indication, the sixth received signal strength indication, the seventh received signal strength indication, and the eighth received signal strength indication) of the radio waves in the memory 3034. The control unit 3035 may notify the vehicle 20 of the fifth received signal strength indication, the sixth received signal strength indication, the seventh received signal strength indication, and the eighth received signal strength indication. In this way, a distance between the vehicle 20 and the mobile terminal 30 can be obtained on the vehicle 20 (the ECU 60).

The control unit 3035 obtains the distance between the vehicle 20 and the mobile terminal 30 based on the received signal strength indications of the received radio waves. That is, in response to a sum (a third sum) of the first received signal strength indication, the second received signal strength indication, the fifth received signal strength indication, and the sixth received signal strength indication being larger than a sum (a fourth sum) of the third received signal strength indication, the fourth received signal strength indication, the seventh received signal strength indication, and the eighth received signal strength indication, the control unit 3035 obtains the distance between the vehicle 20 and the mobile terminal 30 based on a first phase difference between the first radio wave and the second radio wave and a second phase difference between the fifth radio wave and the sixth radio wave. In response to the sum (the third sum) of the first received signal strength indication, the second received signal strength indication, the fifth received signal strength indication, and the sixth received signal strength indication being larger than the sum (the fourth sum) of the third received signal strength indication, the fourth received signal strength indication, the seventh received signal strength indication, and the eighth received signal strength indication, the control unit 3035 obtains the distance between the vehicle 20 and the mobile terminal 30 based on a third phase difference between the third radio wave and the fourth radio wave and a fourth phase difference between the seventh radio wave and the eighth radio wave.

In the calculation of the distance between the vehicle 20 and the mobile terminal 30, the sum of the first received signal strength indication, the second received signal strength indication, the fifth received signal strength indication, and the sixth received signal strength indication is used, but it is sufficient to include an ingredient of the sum of the first received signal strength indication, the second received signal strength indication, the fifth received signal strength indication, and the sixth received signal strength indication. For example, an average value can be used by dividing the first received signal strength indication, the second received signal strength indication, the fifth received signal strength indication, and the sixth received signal strength indication by 4. Similarly, the sum of the third received signal strength indication, the fourth received signal strength indication, the seventh received signal strength indication, and the eighth received signal strength indication is used, but it is sufficient to include an ingredient of the sum of the third received signal strength indication, the fourth received signal strength indication, the seventh received signal strength indication, and the eighth received signal strength indication.

The control unit 3035 includes a central processing unit (CPU) (not illustrated), a read only memory (ROM) (not illustrated) storing a program for controlling the CPU, and a random access memory (RAM) (not illustrated) used for an operation of the CPU.

The control circuit 303 includes the oscillator 3031, the transmission unit 3032, the reception unit 3033, the memory 3034, and the control unit 3035, but may include only the memory 3034 and the control unit 3035, or the control unit 3035 may serve as the control circuit 303.

In FIG. 1, the ECU 60 includes a first antenna 601, a second antenna 602, an antenna switching switch 603, a front-end unit 604, and a control circuit (a second control circuit) 605. The first antenna 601 is a first dipole antenna, and includes at least a first hot element and a first ground element each of which is formed of a first conductive member, an effective length of the first hot element is ¼ of a wavelength of a used frequency, and an effective length of the first ground element is ¼ of the wavelength of the used frequency.

The second antenna 602 is a second dipole antenna, and includes at least a second hot element and a second ground element each of which is formed of a second conductive member, an effective length of the second hot element is ¼ of a wavelength of a used frequency, and an effective length of the second ground element is ¼ of the wavelength of the used frequency.

A first polarization direction of the first antenna 601 is different from a second polarization direction of the second antenna 602. In the present embodiment, the first antenna 601 and the second antenna 602 are disposed in directions orthogonal to each other, the first antenna 601 is used for vertical polarization, and the second antenna 602 is used for horizontal polarization. Specific structures of the first antenna 601 and the second antenna 602 will be described later.

The antenna switching switch 603 alternately switches between the first antenna 601 and the second antenna 602 according to a switching signal from the control circuit 605. Similarly to the front-end unit 302 of the mobile terminal 30 described above, the front-end unit 604 performs amplification of a weak signal, conversion from a high frequency to a low frequency, prevention of wraparound of a transmission signal to a reception unit side, and the like.

The control circuit 605 includes an oscillator 6051, a transmission unit 6052, a reception unit 6053, a memory (a second storage unit) 6054, and a control unit (a second control circuit) 6055. The oscillator 6051 is a local oscillator that generates a carrier wave signal similarly to the oscillator 3031 of the control circuit 303 described above. The transmission unit 6052 generates a radio wave from IQ data (a baseband signal) to be transmitted, and performs control to transmit the radio wave from the first antenna 601 or the second antenna 602 via the front-end unit 604 and the antenna switching switch 603. The transmission unit 6052 performs control to transmit at least the fifth radio wave having the first wavelength and the sixth radio wave having the second wavelength from the first antenna 601. The transmission unit 6052 performs control to transmit at least the seventh radio wave having the third wavelength and the eighth radio wave having the fourth wavelength from the second antenna 602.

The reception unit 6053 extracts IQ data from the radio wave received by the first antenna 601 or the second antenna 602, and detects a received signal strength indication (RSSI). For example, in response to the first antenna 601 receiving the first radio wave having the first wavelength and the second radio wave having the second wavelength, the reception unit 6053 detects the first received signal strength indication of the first radio wave and the second received signal strength indication of the second radio wave. In response to the second antenna 602 receiving the third radio wave having the third wavelength and the fourth radio wave having the fourth wavelength, the third received signal strength indication of the third radio wave and the fourth received signal strength indication of the fourth radio wave are detected.

The control unit 6055 controls switching with respect to the antenna switching switch 603 and controls transmission timing with respect to the transmission unit 6052 (trigger control). The control of the transmission timing in the control unit 6055 is performed to transmit the fifth radio wave having the first wavelength and the sixth radio wave having the second wavelength after switching to the first antenna 601, and to transmit the seventh radio wave having the third wavelength and the eighth radio wave having the fourth wavelength after switching to the second antenna 602.

The control unit 6055 performs control to store the received signal strength indications of the radio waves received by the reception unit 6053 in the memory 6054. That is, the control unit 6055 stores the first received signal strength indication of the first radio wave having the first wavelength and the second received signal strength indication of the second radio wave having the second wavelength, which are received by the first antenna 601, in the memory 6054, and stores the third received signal strength indication of the third radio wave having the third wavelength and the fourth received signal strength indication of the fourth radio wave having the fourth wavelength, which are received by the second antenna 602, in the memory 6054. The second wavelength is a wavelength different from the first wavelength, and the fourth wavelength is a wavelength different from the third wavelength.

The control unit 6055 obtains the distance between the vehicle 20 and the mobile terminal 30 based on the received signal strength indications of the received radio waves. That is, in response to a sum (a first sum) of the first received signal strength indication and the second received signal strength indication being larger than a sum (a second sum) of the third received signal strength indication and the fourth received signal strength indication, the control unit 6055 obtains the distance between the vehicle 20 and the mobile terminal 30 from a phase difference between the first radio wave and the second radio wave, and in response to the first sum of the first received signal strength indication and the second received signal strength indication being smaller than the second sum of the third received signal strength indication and the fourth received signal strength indication, the control unit 6055 obtains the distance between the vehicle 20 and the mobile terminal 30 from a phase difference between the third radio wave and the fourth radio wave.

In the calculation of the distance between the vehicle 20 and the mobile terminal 30, the sum of the first received signal strength indication and the second received signal strength indication is used, but it is sufficient to include an ingredient of the sum of the first received signal strength indication and the second received signal strength indication. For example, an average value can be used by dividing the first received signal strength indication and the second received signal strength indication by 2. Similarly, it may be sufficient to include an ingredient of a sum of the third received signal strength indication and the fourth received signal strength indication. For example, an average value can be used by dividing the third received signal strength indication and the fourth received signal strength indication by 2.

After calculating the distance between the vehicle 20 and the mobile terminal 30, the control unit 6055 changes a setting of the vehicle 20 according to the calculated distance. In this case, in response to the distance between the vehicle 20 and the mobile terminal 30 being a predetermined value or more, the operation of the mobile terminal 30 is not accepted, and in response to the distance being the predetermined value or less, the operation of the mobile terminal 30 is accepted. In response to the distance between the vehicle 20 and the mobile terminal 30 being the predetermined value, the operation of the mobile terminal 30 may be accepted or may not be accepted.

Similarly to the control unit 3035 of the mobile terminal 30, the control unit 6055 includes a CPU (not illustrated), a ROM (not illustrated) storing a program for controlling the CPU, and a RAM (not illustrated) used for the operation of the CPU.

Figure 3:
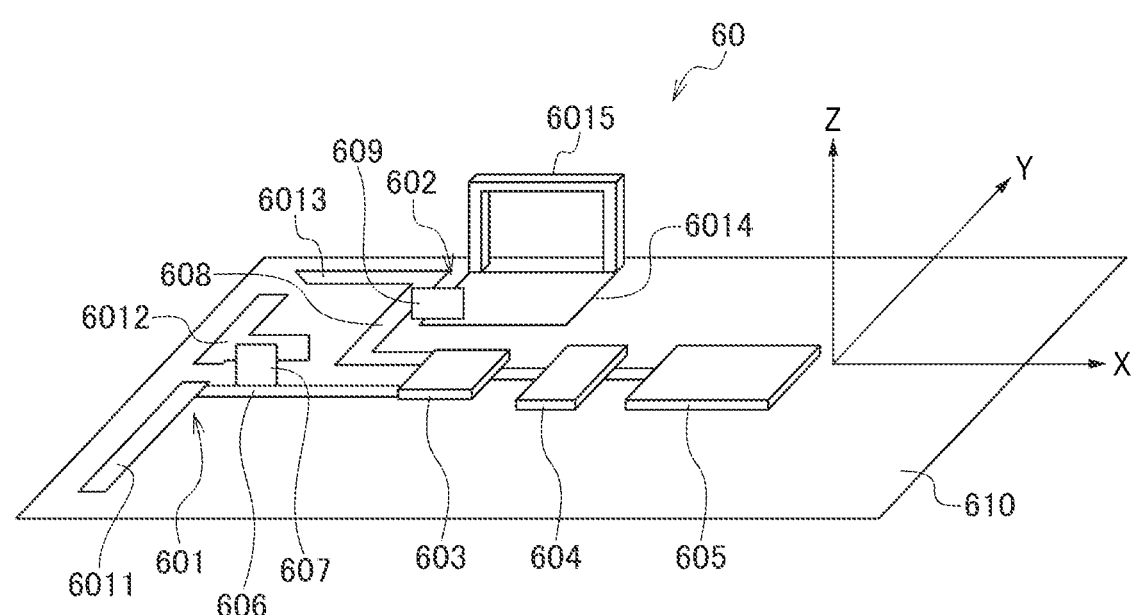
FIG. 3 is a perspective view illustrating an appearance of an ECU constituting the wireless system according to the embodiment.

FIG. 3 is a perspective view illustrating an external appearance of the ECU 60. In the same diagram, a substrate 610 constituting the ECU 60 has a predetermined insulating property and is disposed inside the vehicle 20. On the substrate 610, the first antenna 601 which is a first dipole antenna, the second antenna 602 which is a second dipole antenna, a feeding line 606 for feeding power to the first antenna 601, and a feeding line 608 for feeding power to the second antenna 602 are formed in a pattern. In this case, the first antenna 601 and the second antenna 602 are disposed in directions orthogonal to each other. The first antenna 601 is used as a vertical polarization antenna, and the second antenna 602 is used as a horizontal polarization antenna.

The first antenna 601 includes a first hot element 6011 and a first ground element 6012. An antenna length (the effective length) of the first antenna 601 is set to ¼ of a wavelength on both sides of the first hot element 6011 and the first ground element 6012 in a manner that a maximum gain of the dipole antenna is obtained. The antenna length is 3 cm in response to the used frequency being 2.4 GHz band. An antenna matching capacitor 607 is mounted between the first hot element 6011 and the first ground element 6012.

The second antenna 602 includes a second hot element 6013 and a sheet metal portion 6015 (a second ground element) which is a loop shaped portion having a U-shaped frame shape. The second antenna 602 has a shape of a dipole and has a directivity in a shape of a Japanese word "eight", and thus the second antenna 602 is formed with a solid ground 6014 under the antenna in a manner that the ground side is formed into a loop shape with a ground using a sheet metal, and the loop with the ground is strengthened to radiate the horizontal polarization. The same as the first antenna 601, an antenna length is set to ¼ of a wavelength on both sides of the second hot element 6013 and the ground. In response to a used frequency being 2.4 GHz band, the second hot element 6013 is 3 cm and the sheet metal portion 6015 is 3 cm. Each side of the sheet metal portion 6015 has a total of 3 cm at 1 cm. Similarly to the first antenna 601, an antenna matching capacitor 609 is mounted between the second hot element 6013 and the solid ground 6014.

Figure 4:
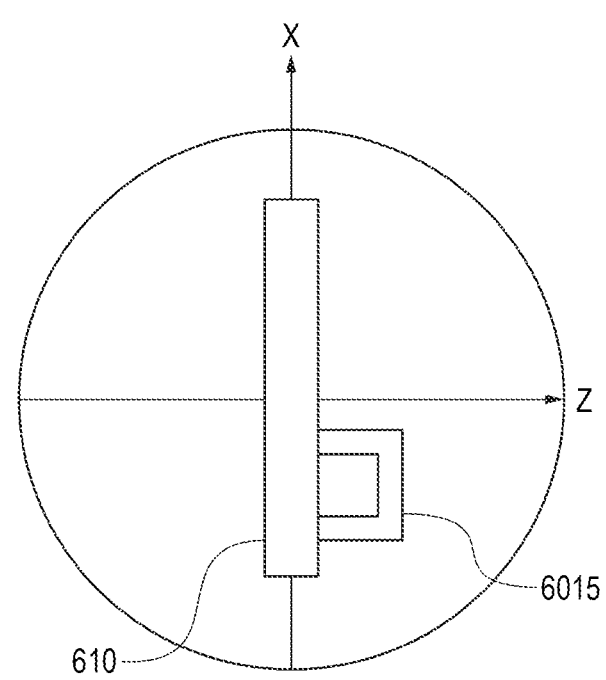
FIG. 4 is a diagram illustrating a positional relation between a substrate and a sheet metal portion in a mounted state of the ECU constituting the wireless system according to the embodiment.

FIG. 3 is a perspective view when the ECU 60 is viewed in three axial directions illustrated in the same diagram, FIG. 4 is a diagram illustrating a positional relation between the substrate 610 and the sheet metal portion 6015 in a mounted state in which an X-axis direction is a vertical direction and a Z-axis direction is a horizontal direction. As illustrated in this diagram, the sheet metal portion 6015 is erected in the same direction as a thickness direction of the substrate 610. Both ends of the sheet metal portion 6015 are connected to the solid ground 6014 formed on the substrate 610.

In FIG. 3, the antenna switching switch 603, the front-end unit 604, and the control circuit 605 are mounted on the substrate 610. The control circuit 605 is an integrated circuit.

Figure 5:
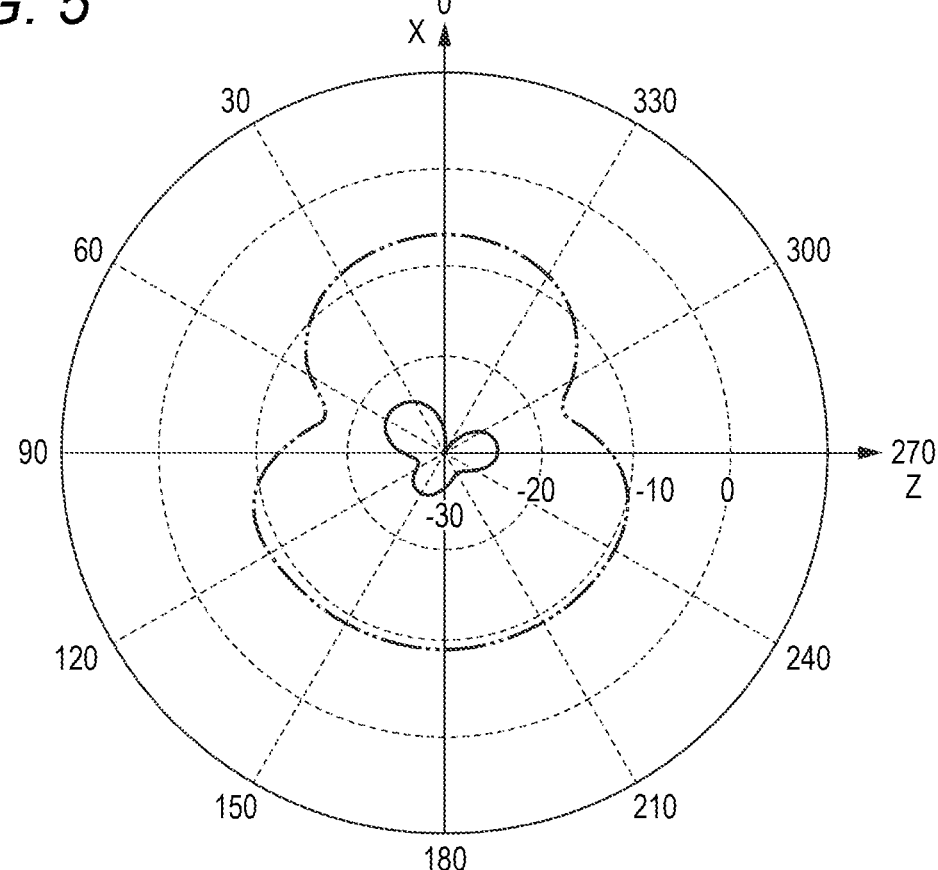
FIG. 5 is a diagram illustrating an antenna gain at each angle of a vertical polarization antenna of the ECU constituting the wireless system according to the embodiment.
Figure 6:
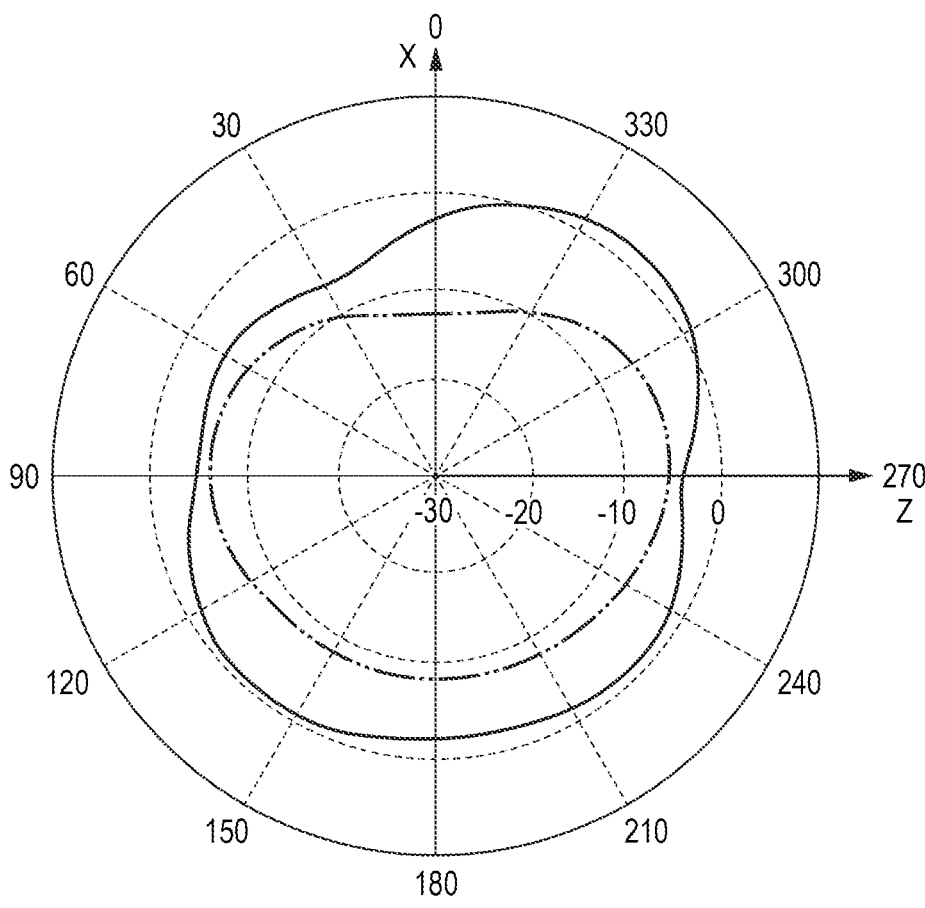
FIG. 6 is a diagram illustrating an antenna gain at each angle of a horizontal polarization antenna of the ECU constituting the wireless system according to the embodiment.

FIG. 5 is a diagram illustrating a result of simulating antenna gains of the first antenna 601. In the same diagram, a two-dot chain line indicates the antenna gain in the vertical polarization, and the solid line indicates the antenna gain in the horizontal polarization. The first antenna 601 is a vertical polarization antenna, and thus the antenna gain at each angle is larger in the vertical polarization. Meanwhile, FIG. 6 is a diagram illustrating a result of simulating antenna gains of the second antenna 602. In the same diagram, a two-dot chain line indicates the antenna gain in the vertical polarization, and the solid line indicates the antenna gain in the horizontal polarization. The second antenna 602 is a horizontal polarization antenna, and thus the antenna gain at each angle is larger in the horizontal polarization.

In the second antenna 602, the sheet metal portion 6015 is a ground, the second hot element 6013 is a hot line, but the sheet metal portion 6015 may be a hot line, and the second hot element 6013 may be a ground.

Lengths of the first hot element 6011, the second hot element 6013, the first ground element 6012, and the sheet metal portion 6015 vary depending on a material and a layer configuration of the substrate 610, and thus can be optionally changed according to the substrate 610.

Next, an operation of the wireless system 10 according to the present embodiment will be described.

Figure 7:
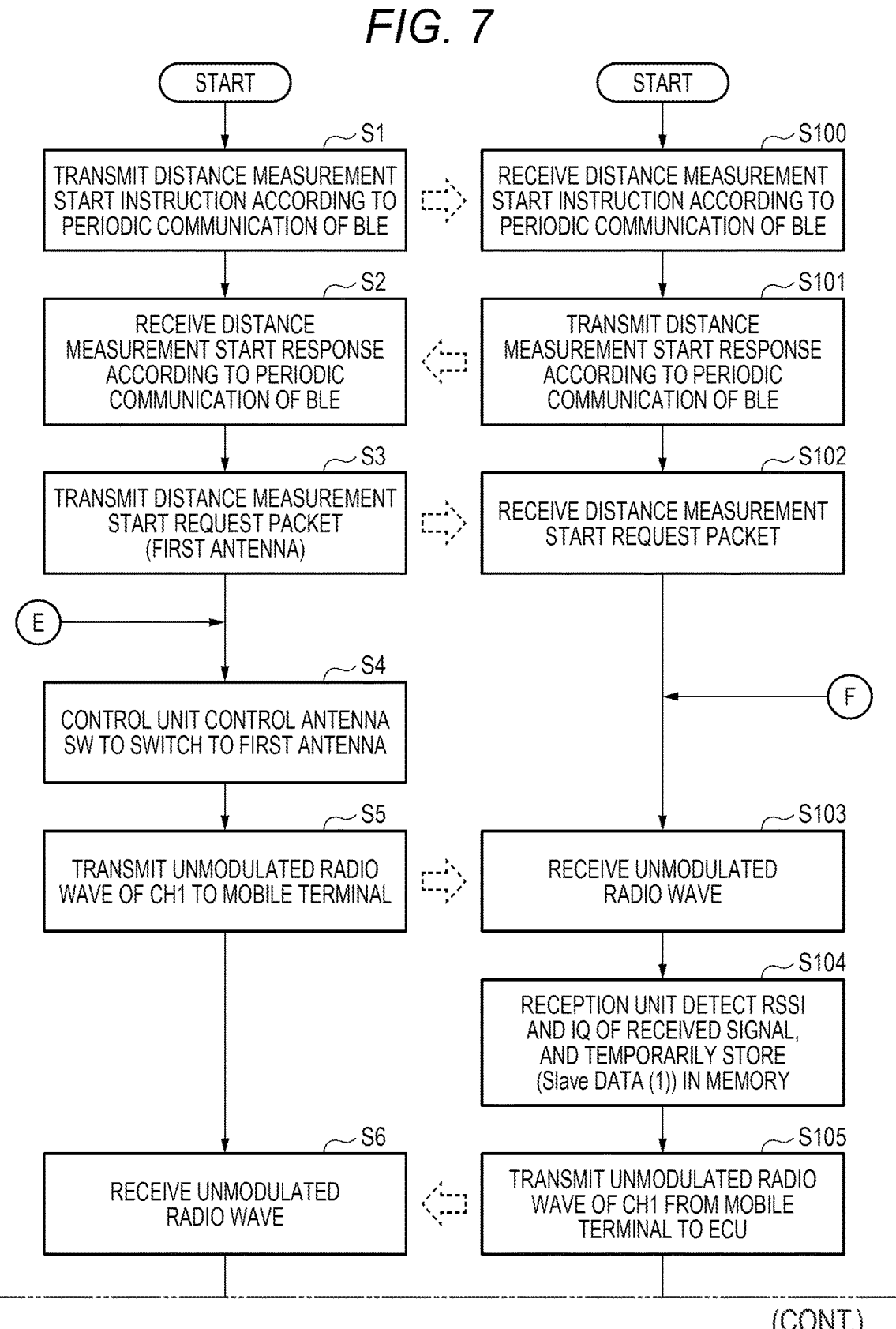
FIG. 7 is a flowchart illustrating operations of the ECU and a mobile terminal constituting the wireless system according to the embodiment.
Figure 8:
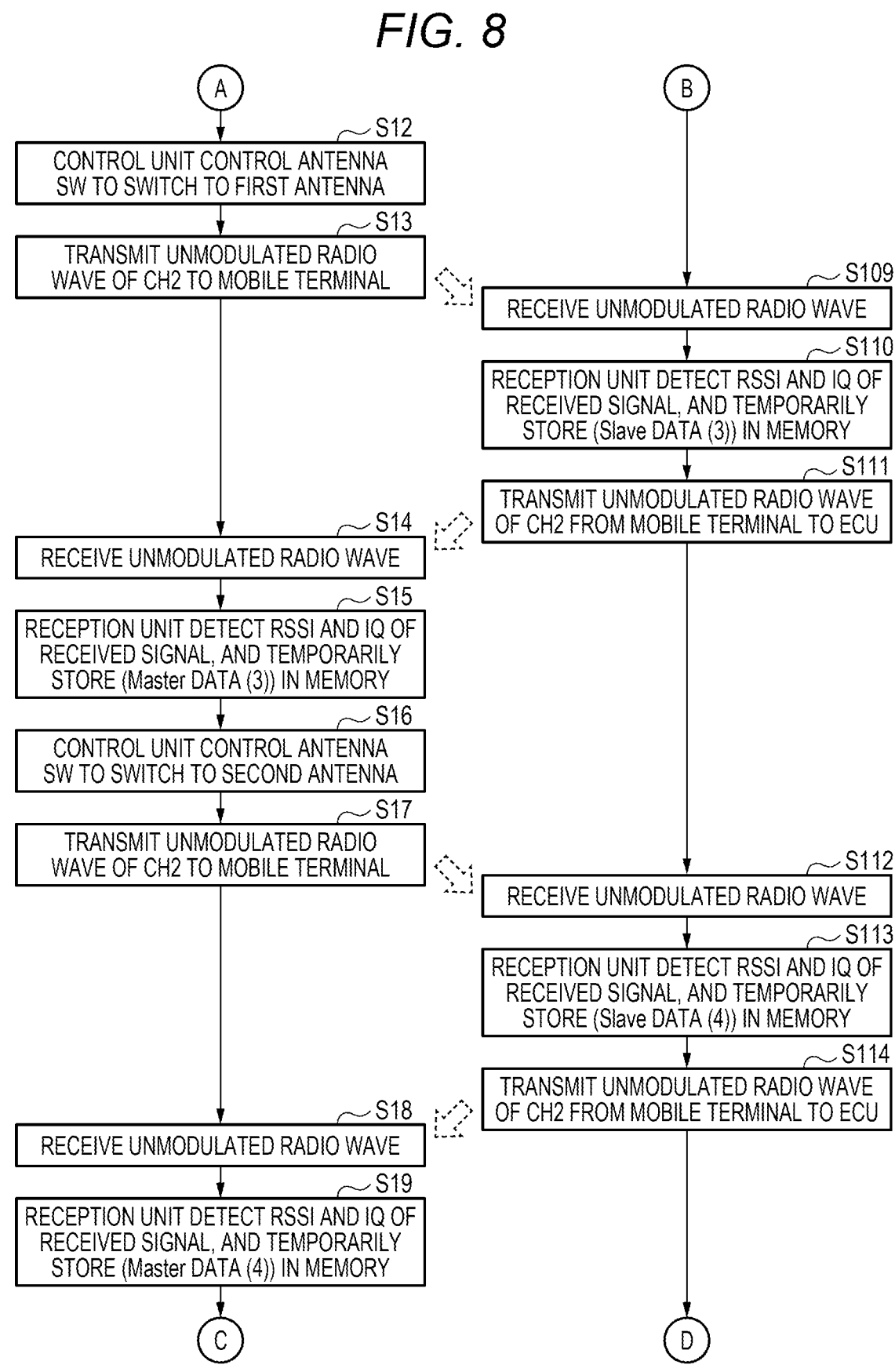
FIG. 8 is a flowchart illustrating operations of the ECU and the mobile terminal constituting the wireless system according to the embodiment.
Figure 9:
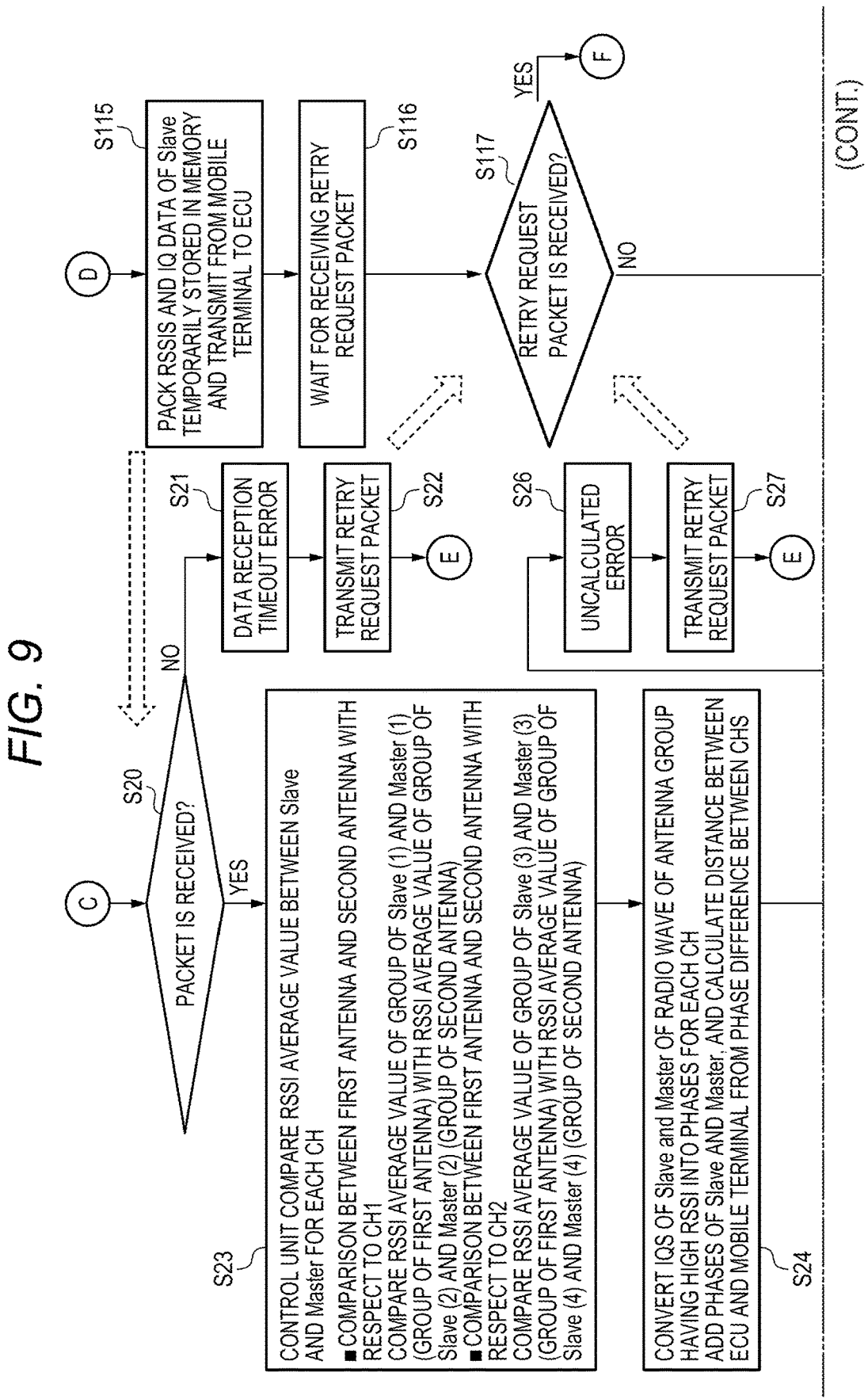
FIG. 9 is a flowchart illustrating operations of the ECU and a mobile terminal constituting the wireless system according to the embodiment.

FIGS. 7 to 9 are flowcharts each illustrating operations of the mobile terminal 30 and the ECU 60 constituting the wireless system 10 according to the present embodiment. Processing executed by the mobile terminal 30 and processing executed by the ECU 60 are both executed at a timing of a periodic communication of BLE (that is, a predetermined time interval). This means that the processing from the start to the end is not completed only once.

In FIG. 7, the ECU 60 transmits a distance measurement start instruction according to the periodic communication of BLE (step S1). BLE performs the periodic communication at regular intervals, and thus when there is a distance measurement start instruction during the periodic communication, a subsequent flow is executed between periodic communications. The mobile terminal 30 receives the distance measurement start instruction according to the periodic communication of BLE (step S100). Upon receiving the distance measurement start instruction, the mobile terminal 30 transmits a distance measurement start response according to the periodic communication of BLE (step S101). The ECU 60 receives the distance measurement start response according to the periodic communication of BLE (step S2).

Upon receiving the distance measurement start response, the ECU 60 transmits a distance measurement start request packet (step S3). The mobile terminal 30 receives the distance measurement start request packet transmitted from the ECU 60 (step S102). FIG. 10 is a diagram illustrating a structure of the distance measurement start request packet. As illustrated in the same diagram, the distance measurement start request packet includes "Preamble", "device ID", "command (distance measurement start instruction)", and "CRC (cyclic redundancy code)".

After the distance measurement start request packet is transmitted, the control unit 6055 controls the antenna switching switch 603 to switch to the first antenna 601 (step S4). After switching to the first antenna 601, the ECU 60 transmits an unmodulated radio wave of a channel 1 (a CH1) to the mobile terminal 30 (step S5). The mobile terminal 30 receives the unmodulated radio wave (step S103). The reception unit 3033 of the mobile terminal 30 detects a RSSI and IQ data of the received signal, and temporarily stores (Slave data (1)) in the memory 3034 (step S104). FIG. 11 is a diagram illustrating a structure of a Slave data transmission packet. As illustrated in the same diagram, the Slave data transmission packet includes "Preamble", "device ID", "command (Slave data)", "Slave RSSI", "Slave IQ data", and "CRC". After storing the RSSI and the IQ data of the received signal in the memory 3034, the mobile terminal 30 transmits the unmodulated radio wave of the CH1 to the ECU 60 (step S105).

The ECU 60 receives the unmodulated radio wave transmitted from the mobile terminal 30 (step S6). In this case, the ECU 60 forcibly transitions to a next flow in order to receive several signals including noise. When the ECU 60 receives the unmodulated radio wave, the reception unit 6053 detects a RSSI and IQ data of the received signal, and temporarily stores (Master data (1)) in the memory 6054 (step S7). Next, the control unit 6055 of the ECU 60 controls the antenna switching switch 603 to switch to the second antenna 602 (step S8). After switching to the second antenna 602, the ECU 60 transmits the unmodulated radio wave of the channel 1 (the CH1) to the mobile terminal 30 (step S9). The mobile terminal 30 receives the unmodulated radio wave (step S106). The reception unit 3033 of the mobile terminal 30 detects a RSSI and IQ data of the received signal, and temporarily stores (Slave data (2)) in the memory 3034 (step S107). Next, the mobile terminal 30 transmits the unmodulated radio wave of the CH1 to the ECU 60 (step S108).

The ECU 60 receives the unmodulated radio wave transmitted from the mobile terminal 30 (step S10). When the ECU 60 receives the unmodulated radio wave, the reception unit 6053 detects a RSSI and IQ data of the received signal, and temporarily stores (Master data (2)) in the memory 6054 (step S11). The control unit 6055 controls the antenna switching switch 603 to switch to the first antenna 601 (step S12). After switching to the first antenna 601, the ECU 60 transmits an unmodulated radio wave of a channel 2 (a CH2) to the mobile terminal 30 (step S13).

The mobile terminal 30 receives the unmodulated radio wave (step S109). The reception unit 3033 of the mobile terminal 30 detects a RSSI and IQ data of the received signal, and temporarily stores (Slave data (3)) in the memory 3034 (step S110). Next, the mobile terminal 30 transmits the unmodulated radio wave of the CH2 to the ECU 60 (step S111). The ECU 60 receives the unmodulated radio wave transmitted from the mobile terminal 30 (step S14). In this case, the ECU 60 forcibly transitions to a next flow in order to receive several signals including noise. When the ECU 60 receives the unmodulated radio wave, the reception unit 6053 detects a RSSI and IQ data of the received signal, and temporarily stores (Master data (3)) in the memory 6054 (step S15). Next, the control unit 6055 of the ECU 60 controls the antenna switching switch 603 to switch to the second antenna 602 (step S16).

After switching to the second antenna 602, the ECU 60 transmits the unmodulated radio wave of the channel 2 (the CH2) to the mobile terminal 30 (step S17). The mobile terminal 30 receives the unmodulated radio wave (step S112). The reception unit 3033 of the mobile terminal 30 detects a RSSI and IQ data of the received signal, and temporarily stores (Slave data (4)) in the memory 3034 (step S113). Next, the mobile terminal 30 transmits the unmodulated radio wave of the CH2 to the ECU 60 (step S114). The ECU 60 receives the unmodulated radio wave transmitted from the mobile terminal 30 (step S18). When the ECU 60 receives the unmodulated radio wave, the reception unit 6053 detects a RSSI and IQ data of the received signal, and temporarily stores (Master data (4)) in the memory 6054 (step S19).

In FIG. 9, after the unmodulated radio wave of the CH2 is transmitted from the mobile terminal 30 to the ECU 60, the RSSIs and IQ data of the Slave data temporarily stored in the memory 3034 are packed and transmitted from the mobile terminal 30 to the ECU 60 (step S115). Thereafter, the mobile terminal 30 waits for receiving a retry request packet (step S116). The mobile terminal 30 determines whether the retry request packet is received (step S117). In response to determining that the retry request packet is received ("YES" in step S117), the mobile terminal 30 returns to step S103. In response to determining that the retry request packet is not received ("NO" in step S117), the mobile terminal 30 receives the periodic communication of BLE (step S118). Upon receiving the periodic communication of BLE, the mobile terminal 30 transmits a periodic communication response of BLE (step S119), and ends this processing.

After the reception unit 6053 detects the RSSI and the IQ data of the received signal and temporarily stores the detection result in the memory 6054, the ECU 60 determines whether the packet of the RSSI and the IQ data of the Slave data transmitted by the mobile terminal 30 is received (step S20). When the ECU 60 determines that the packet is not received ("NO" in step S20), if the period for receiving the packet is elapsed, the ECU 60 sets a timeout error (step S21) and transmits a retry request packet (step S22).

When the ECU 60 determines that the packet is received ("YES" in step S20), the control unit 6055 compares a RSSI average value between the Slave data and the Master data for each channel (CH) (step S23). In this case, the comparison between the first antenna 601 and the second antenna 602 with respect to the CH1 is performed by comparing a RSSI average value of a group of the Slave data (1) and the Master data (1) (that is, a group of the first antenna 601) with a RSSI average value of a group of the Slave data (2) and the Master data (2) (that is, a group of the second antenna 602).

The comparison between the first antenna 601 and the second antenna 602 with respect to the CH2 is performed by comparing a RSSI average value of a group of the Slave data (3) and the Master data (3) (that is, a group of the first antenna 601) with a RSSI average value of a group of the Slave data (4) and the Master data (4) (that is, a group of the second antenna 602).

The ECU 60 converts IQ data of a Slave data and a Master data of a radio wave of an antenna group having a high RSSI into phases for each CH. Next, the phases of the Slave data and the Master data are added, and a distance between the ECU 60 and the mobile terminal 30 is calculated from a phase difference between the CHs (step S24).

The ECU 60 determines whether the calculated result (that is, the distance between the ECU 60 and the mobile terminal 30) is within a predetermined range (step S25). In response to determining that the distance between the ECU 60 and the mobile terminal 30 is not within the predetermined range ("NO" in step S25), the ECU 60 determines that there is an uncalculated error (step S26), and transmits the retry request packet to the mobile terminal 30 (step S27). After the retry request packet is transmitted, the processing returns to step S4. FIG. 12 is a diagram illustrating a structure of the retry request packet. As illustrated in the same diagram, the retry request packet includes "Preamble", "device ID", "command (retry request)", and "CRC".

In response to determining that the distance between the ECU 60 and the mobile terminal 30 is within the predetermined range ("YES" in step S25), the ECU 60 adopts the calculated distance (step S28). Next, the ECU 60 transmits the periodic communication of BLE (step S29). The ECU 60 receives the periodic communication response of BLE transmitted from the mobile terminal 30 (step S30), and ends this processing.

As described above, in the wireless system 10 according to the present embodiment, the radio wave can be separated into a horizontal polarization and a vertical polarization, the position of the null is different between the horizontal polarization and the vertical polarization, and by using characteristics that when being blocked by a human body, the horizontal polarization easily wraps around the human body than the vertical polarization, and the decrease in RSSI is small, the two antennas of the second antenna 602 for receiving the horizontal polarization and the first antenna 601 for receiving the vertical polarization are disposed on the substrate, and the first antenna 601 and the second antenna 602 are alternately switched to acquire the RSSI and the phase information by the first and second antennas 601 and 602, and the phase information of the antenna having a higher RSSI is used to calculate the distance between the vehicle 20 (the ECU 60) and the mobile terminal 30, and thus the distance between the vehicle 20 and the mobile terminal 30 can be measured accurately and inexpensively.

In the wireless system 10 according to the present embodiment, electromagnetic waves are used for the wireless communication between the vehicle 20 and the mobile terminal 30, but light (which is also a kind of electromagnetic wave) may be used.

Although the present disclosure has been described in detail with reference to a specific embodiment, it is obvious to those skilled in the art that various changes and modifications can be made without departing from the spirit and scope of the present disclosure.

The present application is based on a Japan patent application (Japanese Patent Application No. 2021-108963) filed on Jun. 30, 2021, and the contents thereof are incorporated herein by reference.

INDUSTRIAL APPLICABILITY

The wireless system according to the present disclosure is useful for a vehicle such as a motorcycle.

REFERENCE SIGNS LIST

10: wireless system
20: vehicle
21: vehicle body
22: front wheel
23: rear wheel
30: mobile terminal
60: ECU
301: third antenna
302, 604: front-end unit
303, 605: control circuit
601: first antenna
602: second antenna
603: antenna switching switch
606, 608: feeding line
607, 609: antenna matching capacitor
610: substrate
3031, 6051: oscillator
3032, 6052: transmission unit

3033, 6053: reception unit
3034, 6054: memory
3035, 6055: control unit
6011: first hot element
6012: first ground element
6013: second hot element
6014: solid ground
6015: sheet metal portion

What is claimed is:

1. A wireless system, comprising:
a vehicle; and
a mobile terminal, wherein
the vehicle includes
    a vehicle body,
    a first wheel and a second wheel coupled to the vehicle body,
    a substrate disposed inside the vehicle body and having a predetermined insulating property,
    a first antenna of which at least a part is formed of a first conductive member having a predetermined conductivity on the substrate, and
    a second antenna of which at least a part is formed of a second conductive member having a predetermined conductivity on the substrate,
the vehicle is configured to move with the first wheel and the second wheel,
the mobile terminal includes a third antenna,
on the substrate, a first polarization direction of the first antenna is different from a second polarization direction of the second antenna,
the third antenna of the mobile terminal is configured to transmit at least a first radio wave having a first wavelength and a second radio wave having a second wavelength different from the first wavelength,
the first antenna of the vehicle is configured to receive the first radio wave and the second radio wave, and detect a first received signal strength indication of the first radio wave and a second received signal strength indication of the second radio wave,
the third antenna of the mobile terminal is configured to transmit at least a third radio wave having a third wavelength and a fourth radio wave having a fourth wavelength different from the third wavelength,
the second antenna of the vehicle is configured to receive the third radio wave and the fourth radio wave, and detect a third received signal strength indication of the third radio wave and a fourth received signal strength indication of the fourth radio wave,
in a case that a first sum of the first received signal strength indication and the second received signal strength indication is larger than a second sum of the third received signal strength indication and the fourth received signal strength indication, a distance between the vehicle and the mobile terminal is obtained from a phase difference between the first radio wave and the second radio wave, and
in a case that the first sum of the first received signal strength indication and the second received signal strength indication is smaller than the second sum of the third received signal strength indication and the fourth received signal strength indication, the distance between the vehicle and the mobile terminal is obtained from a phase difference between the third radio wave and the fourth radio wave.

2. The wireless system according to claim 1, wherein
the first antenna of the vehicle is configured to transmit at
least a fifth radio wave having the first wavelength and
a sixth radio wave having the second wavelength,
the third antenna of the mobile terminal is configured to
receive the fifth radio wave and the sixth radio wave,
and detect a fifth received signal strength indication of
the fifth radio wave and a sixth received signal strength
indication of the sixth radio wave,
the second antenna of the vehicle is configured to transmit
at least a seventh radio wave having the third wave-
length and an eighth radio wave having the fourth
wavelength,
the third antenna of the mobile terminal is configured to
receive the seventh radio wave and the eighth radio
wave, and detect a seventh received signal strength
indication of the seventh radio wave and an eighth
received signal strength indication of the eighth radio
wave,
in a case that a third sum of the first received signal
strength indication, the second received signal strength
indication, the fifth received signal strength indication,
and the sixth received signal strength indication is
larger than a fourth sum of the third received signal
strength indication, the fourth received signal strength
indication, the seventh received signal strength indica-
tion, and the eighth received signal strength indication,
the distance between the vehicle and the mobile termi-
nal is obtained from a first phase difference between the
first radio wave and the second radio wave and a second
phase difference between the fifth radio wave and the
sixth radio wave, and
in a case that the third sum of the first received signal
strength indication, the second received signal strength
indication, the fifth received signal strength indication,
and the sixth received signal strength indication is
smaller than the fourth sum of the third received signal
strength indication, the fourth received signal strength
indication, the seventh received signal strength indica-
tion, and the eighth received signal strength indication,
the distance between the vehicle and the mobile termi-
nal is obtained from a third phase difference between
the third radio wave and the fourth radio wave and a
fourth phase difference between the seventh radio wave
and the eighth radio wave.

3. The wireless system according to claim 2, wherein
the mobile terminal is configured to notify the vehicle of
the fifth received signal strength indication, the sixth
received signal strength indication, the seventh
received signal strength indication, and the eighth
received signal strength indication, and
the vehicle is configured to obtain the distance between
the vehicle and the mobile terminal.

4. The wireless system according to claim 2, wherein
the mobile terminal includes a first storage unit configured
to hold at least the fifth received signal strength indi-
cation, the sixth received signal strength indication, the
seventh received signal strength indication, and the
eighth received signal strength indication.

5. The wireless system according to claim 1, wherein
the vehicle includes a second storage unit configured to
hold at least the first received signal strength indication,
the second received signal strength indication, the third
received signal strength indication, and the fourth
received signal strength indication.

6. The wireless system according to claim 1, wherein
the mobile terminal includes a first control circuit, and
the vehicle includes a second control circuit.

7. The wireless system according to claim 1, wherein
a setting of the vehicle is changed according to the
distance between the vehicle and the mobile terminal.

8. The wireless system according to claim 1, wherein
the first wavelength is the same as the third wavelength,
and
the second wavelength is the same as the fourth wave-
length.

9. The wireless system according to claim 1, wherein
the first antenna is a first dipole antenna,
the first dipole antenna includes at least a first hot element
and a first ground element,
an effective length of the first hot element is ¼ of a
wavelength of a used frequency, and
an effective length of the first ground element is ¼ of the
wavelength of the used frequency.

10. The wireless system according to claim 1, wherein
the second antenna is a second dipole antenna,
the second dipole antenna includes at least a second hot
element and a second ground element,
an effective length of the second hot element is ¼ of a
wavelength of a used frequency,
the second ground element includes a loop shaped por-
tion, and
an effective length of the loop shaped portion is ¼ of the
wavelength of the used frequency.

11. A wireless system, comprising:
a mobile terminal; and
a wireless communication device configured to be
mounted on a vehicle, wherein
the wireless communication device includes
a substrate disposed inside a vehicle body of the vehicle
and having a predetermined insulating property,
a first antenna of which at least a part is formed of a first
conductive member having a predetermined conduc-
tivity on the substrate, and
a second antenna of which at least a part is formed of
a second conductive member having a predeter-
mined conductivity on the substrate,
the mobile terminal includes a third antenna,
on the substrate, a first polarization direction of the first
antenna is different from a second polarization direc-
tion of the second antenna,
the third antenna of the mobile terminal is configured to
transmit at least a first radio wave having a first
wavelength and a second radio wave having a second
wavelength different from the first wavelength,
the first antenna of the wireless communication device is
configured to receive the first radio wave and the
second radio wave, and detect a first received signal
strength indication of the first radio wave and a second
received signal strength indication of the second radio
wave,
the third antenna of the mobile terminal is configured to
transmit at least a third radio wave having a third
wavelength and a fourth radio wave having a fourth
wavelength different from the third wavelength,
the second antenna of the wireless communication device
is configured to receive the third radio wave and the
fourth radio wave, and detect a third received signal
strength indication of the third radio wave and a fourth
received signal strength indication of the fourth radio
wave, in a case that a first sum of the first received signal strength indication and the second received signal strength indication is larger than a second sum of the third received signal strength indication and the fourth received signal strength indication, a distance between the wireless communication device and the mobile terminal is obtained from a phase difference between the first radio wave and the second radio wave, and in a case that the first sum of the first received signal strength indication and the second received signal strength indication is smaller than the second sum of the third received signal strength indication and the fourth received signal strength indication, the distance between the wireless communication device and the mobile terminal is obtained from a phase difference between the third radio wave and the fourth radio wave.

12. The wireless system according to claim 11, wherein the first antenna of the wireless communication device is configured to transmit at least a fifth radio wave having the first wavelength and a sixth radio wave having the second wavelength, the third antenna of the mobile terminal is configured to receive the fifth radio wave and the sixth radio wave, and detect a fifth received signal strength indication of the fifth radio wave and a sixth received signal strength indication of the sixth radio wave, the second antenna of the wireless communication device is configured to transmit at least a seventh radio wave having the third wavelength and an eighth radio wave having the fourth wavelength, the third antenna of the mobile terminal is configured to receive the seventh radio wave and the eighth radio wave, and detect a seventh received signal strength indication of the seventh radio wave and an eighth received signal strength indication of the eighth radio wave, in a case that a third sum of the first received signal strength indication, the second received signal strength indication, the fifth received signal strength indication, and the sixth received signal strength indication is larger than a fourth sum of the third received signal strength indication, the fourth received signal strength indication, the seventh received signal strength indication, and the eighth received signal strength indication, the distance between the wireless communication device and the mobile terminal is obtained from a first phase difference between the first radio wave and the second radio wave and a second phase difference between the fifth radio wave and the sixth radio wave, and in a case that the third sum of the first received signal strength indication, the second received signal strength indication, the fifth received signal strength indication, and the sixth received signal strength indication is smaller than the fourth sum of the third received signal strength indication, the fourth received signal strength indication, the seventh received signal strength indication, and the eighth received signal strength indication, the distance between the wireless communication device and the mobile terminal is obtained from a third phase difference between the third radio wave and the fourth radio wave and a fourth phase difference between the seventh radio wave and the eighth radio wave.

13. The wireless system according to claim 12, wherein the mobile terminal is configured to notify the wireless communication device of the fifth received signal strength indication, the sixth received signal strength indication, the seventh received signal strength indication, and the eighth received signal strength indication, and the wireless communication device is configured to obtain the distance between the wireless communication device and the mobile terminal.

14. The wireless system according to claim 12, wherein the mobile terminal includes a first storage unit configured to hold at least the fifth received signal strength indication, the sixth received signal strength indication, the seventh received signal strength indication, and the eighth received signal strength indication.

15. The wireless system according to claim 11, wherein the wireless communication device includes a second storage unit configured to hold at least the first received signal strength indication, the second received signal strength indication, the third received signal strength indication, and the fourth received signal strength indication.

16. The wireless system according to claim 11, wherein the mobile terminal includes a first control circuit, and the wireless communication device includes a second control circuit.

17. The wireless system according to claim 11, wherein a setting of the vehicle is changed according to the distance between the wireless communication device and the mobile terminal.

18. The wireless system according to claim 11, wherein the first wavelength is the same as the third wavelength, and the second wavelength is the same as the fourth wavelength.

19. The wireless system according to claim 11, wherein the first antenna is a first dipole antenna, the first dipole antenna includes at least a first hot element and a first ground element, an effective length of the first hot element is ¼ of a wavelength of a used frequency, and an effective length of the first ground element is ¼ of the wavelength of the used frequency.

20. The wireless system according to claim 11, wherein the second antenna is a second dipole antenna, the second dipole antenna includes at least a second hot element and a second ground element, an effective length of the second hot element is ¼ of a wavelength of a used frequency, the second ground element includes a loop shaped portion, and an effective length of the loop shaped portion is ¼ of the wavelength of the used frequency.

* * * * *